United States Patent [19]

Kimura

[11] Patent Number: 5,068,673

[45] Date of Patent: Nov. 26, 1991

[54] CLUTCH DEVICE FOR ELECTRICALLY EXTENSIBLE ANTENNAS

[75] Inventor: Misao Kimura, Tokyo, Japan

[73] Assignee: Harada Kogyo Kabushiki Kaisha, Tokyo, Japan

[21] Appl. No.: 543,651

[22] Filed: Jun. 26, 1990

[51] Int. Cl.[5] ..................... H01Q 1/80; H01Q 00/100; B60R 11/20; F16D 7/20

[52] U.S. Cl. ..................................... 343/901; 464/35; 464/41; 464/47

[58] Field of Search ............... 343/711, 712, 713, 714, 343/715, 901, 902, 903; 74/8, 7 R; 464/35, 41, 46, 47, 30

[56] References Cited

U.S. PATENT DOCUMENTS 4,665,406 3/1987 Takizawa et al. .................. 343/714

FOREIGN PATENT DOCUMENTS 0345002 12/1989 European Pat. Off. .
1189807 3/1965 Fed. Rep. of Germany ........ 464/41
0006418 1/1984 Japan .
1260576 9/1986 U.S.S.R. ................................ 464/35
0718339 11/1954 United Kingdom ................ 343/903

*Primary Examiner*—Rolf Hille
*Assistant Examiner*—Peter T. Brown
*Attorney, Agent, or Firm*—Koda and Androlia

[57] ABSTRACT

A clutch for telescopic antenna including a disk shape clutch element and a shallow, cylindrical clutch element facing each other. The cylindrical clutch element is provide with a recess on its inner wall, and the disk shape clutch element is provided with a pair of sliding contacts which are urged in the radial directions and can come into contact with the inner wall surface of the cylindrical clutch element. An engagement ball provided in one of the sliding contacts can engage with the recess of the second element, securing the coupling of the two clutch elements.

1 Claim, 3 Drawing Sheets

CLUTCH DEVICE FOR ELECTRICALLY EXTENSIBLE ANTENNAS

BACKGROUND OF THE INVENTION

1. Field of the Invention

The present invention relates to a clutch device for an telescopic power antenna mounted on automobiles, etc.

2. Prior Art

As is well known, conventional clutches of this type are designed as follows: A rotary force is transmitted by causing one side of a main driving clutch plate, which is connected to a motor side, to press against one side of a driven clutch plate which is connected to an antenna side, so that the antenna element (which constitutes the load) is extended and retracted. When the extension or retraction of the antenna element is completed, the slipping action of the clutch plates allows the motor to rotate alone until the power supplied by a motor is switched off by a limit switch. In this way, motor locking is prevented.

In the conventional clutches designed as described above, inconsistency in the clutch plate pressing contact force tends to occur. Accordingly, it is difficult to obtain a stable clutch function over a long period of time. Furthermore, the thickness of the clutch in the axial direction of the clutch plates tends to become large, so that the overall size of the clutch is increased. In an attempt to eliminate such drawbacks, devices have been proposed in which the main driving clutch plate and driven clutch plate are positioned to face each other in a radial direction, and a means for generating a pressing contact force between the inner circumferential surface of one clutch plate and the outer circumferential surface of the other clutch plate is installed so that rotary force can be transmitted.

FIGS. 3(*a*) and 3(*b*) illustrate a conventional device which is constructed as described above. A rotary shaft C, which is installed inside a housing (not shown) of antenna drive mechanism so as to be able to rotate, is shown at the center of each of the FIGS. An electrically driven telescopic antenna clutch mechanism A is mounted on this rotary shaft C. The electrically driven telescopic antenna clutch mechanism A is made up with a main driving clutch plate 1, a driven clutch plate 2 and a pressing contact mechanism 3. The main driving clutch plate 1 is formed of a synthetic resin and has a gear la formed on its outer circumferential surface for receiving a driving force of a motor (not shown). Similarly, the driven clutch plate 2 is formed of a synthetic resin and has a drive gear **2*a* on its outer circumferential surface for transmitting a driving force to antenna-driving rope. The main driving clutch plate 1 is mounted on the rotary shaft C so that the plate 1 is free to rotate relative to the shaft C. On the other hand, the driven clutch plate 2 is mounted on the rotary shaft C so that it cannot rotate relative to the shaft C. The pressing contact mechanism 3 is designed as follows: an engaging pin 4 which engages with an engaging groove 2*c* formed in inner surface 2*b* of the circumferential wall of the driven clutch plate 2; a first pushing block 5*a* having a tip which pushes the engaging pin 4 against the inner circumferential surface 2*b* of the circumferential wall; a second pushing block 5*b* installed on the opposite side of the mechanism so that it forms a pair with the first pushing block 5*a*, the second pushing block 5*b* having a tip caused to be in sliding contact with the inner surface 2*b* of the circumferential wall; and coil springs 6*a* and 6*b*, which are elastically compressed between the rear sides of the first and second pushing blocks 5*a* and 5*b*, are installed in a housing recess formed in one side of the main driving clutch plate 1**.

When the main driving clutch plate 1 is rotated by a motor in a conventional clutch for use in electrically driven telescopic antennas designed as described above, the rotary force is transmitted to the driven clutch plate 2 via the pin 4 and engaging groove **2*c*. Accordingly, the driven clutch plate 2 rotates together with the main driving clutch plate 1**, so that the antenna element is extended or retracted.

When the extension or retraction of the antenna element is completed, the driven clutch plate 2 stops its rotation. Since the rotation-stopping force of the driven clutch plate 2 naturally exceeds the coupling force between the main driving clutch plate 1 and the driven clutch plate 2, the pin 4 is released from the engaging groove **2*c* and slides on the inner circumferential surface 2*b* of the driven clutch plate 2. In other words, the clutch disengages, so that the main driving clutch plate 1** idles by itself.

In a conventional clutch for use in electrically driven telescopic antennas constructed as above, the following problems arise: when the main driving clutch plate 1 idles upon completion of the extension or retraction of the antenna element, a large impact noise is generated by the engagement and disengagement of the engaging pin 4 with the engaging groove **2*c*. When the engaging pin 4 is disengaged from the engaging groove 2*c*, the frictional force generated between the main driving clutch plate 1 and the driven clutch plate 2 consists almost entirely of the frictional force between the tip of the pushing part 5*b* and the inner surface 2*b* of the circumferential wall of the driven clutch plate 2. As a result, slipping occurs between the main driving clutch plate 1 and the driven clutch plate 2**, creating a situation in which the antenna element might drop by its own weight.

SUMMARY OF THE INVENTION

Accordingly, the object of the present invention is to provide a clutch for use in electrically driven telescopic antennas in which the impact noise caused by the engagement and disengagement o engaging members when the clutch is disengaged is remarkably reduced and in which there is almost no danger of the antenna element dropping by its own weight.

In the present invention, the following means is adopted in order to solve the prior art problems and to achieve the object: a first rotary element formed in a circular plate; and a second rotary element, which is in a cylinder form having a closed end and has an engaging recess in the form of an indentation along the circumferential direction on the inner surface of the circumferential wall, the second rotary element being installed concentrically with the first rotary element and its open end facing one side of the first rotary element. A plurality of sector-shape sliding contacts, which have arc shaped circumferential surfaces coming in a sliding contact with the inner surface of the circumferential wall of the second rotary element, are installed on one side of the first rotary element which faces the open end of the second rotary element, so that the sector-shape sliding contacts can rotate along with the first rotary element. Furthermore, elastic bodies such as coil springs, etc. are installed in an elastically compressed state between the sector-shape sliding contacts so that the respective arc-shaped surface of the sliding contacts is pressed against the inner surface of the circumferential wall of the second rotary element. In addition, an engagement assembly, such as a cylindrical engaging pin and a coil spring, is installed in at least one of the sector-shape sliding contacts, which are pressed against the interior surface of the circumferential wall of the second rotary element by the elastic bodies, so that a portion of the engagement assembly projects beyond the arc-shaped surface of the sector-shape sliding contact and can be press engaged with the engaging recess of the second rotary element. With the above structure, either the first rotary element or the second rotary element is used as a main driving clutch plate which is connected to the motor side, while the other is used as a driven clutch plate, which is connected to the antenna side.

As a result of adopting the means described above, the present invention functions as follows: the arc-shaped surfaces of the sector-shape sliding contacts, each of which has a spreading angle of approximately 150 degrees and rotate together with the first rotary element, are pressed against the inner surface of the circumferential wall of the second rotary element; therefore, the size of area of sliding contact between the inner surface of the circumferential wall and the sliding contacts can be made sufficiently large as required. Thus, the hollow space in the second rotary element, which is in a cylinder form having a closed end, is filled with the sliding contacts, and the second rotary element generates almost no vibration. Accordingly, even if an impact noise should be generated by the engaging recess and engagement assembly, when the main driving clutch plate is idling, this impact noise is not acoustically amplified by the second rotary element and therefore quickly attenuates, so that the noise is eliminated. Furthermore, since the pressing contact force between the sector-shape sliding contacts and the interior surface of the circumferential wall of the second rotary element can be increased, even when the engaging pin, etc. is disengaged from the engaging recess, etc., the frictional force between the main driving clutch plate and the driven clutch plate can be maintained at a required level or greater. Thus, the phenomenon of the antenna element dropping by its own weight in the disengaged state can be eliminated.

DESCRIPTION OF THE DRAWINGS

FIG. 1(*b*) is a cross section viewed in the direction of the arrows form line B—B in FIG. 1(*a*).

DESCRIPTION OF THE PREFERRED EMBODIMENT

Figure 1A:
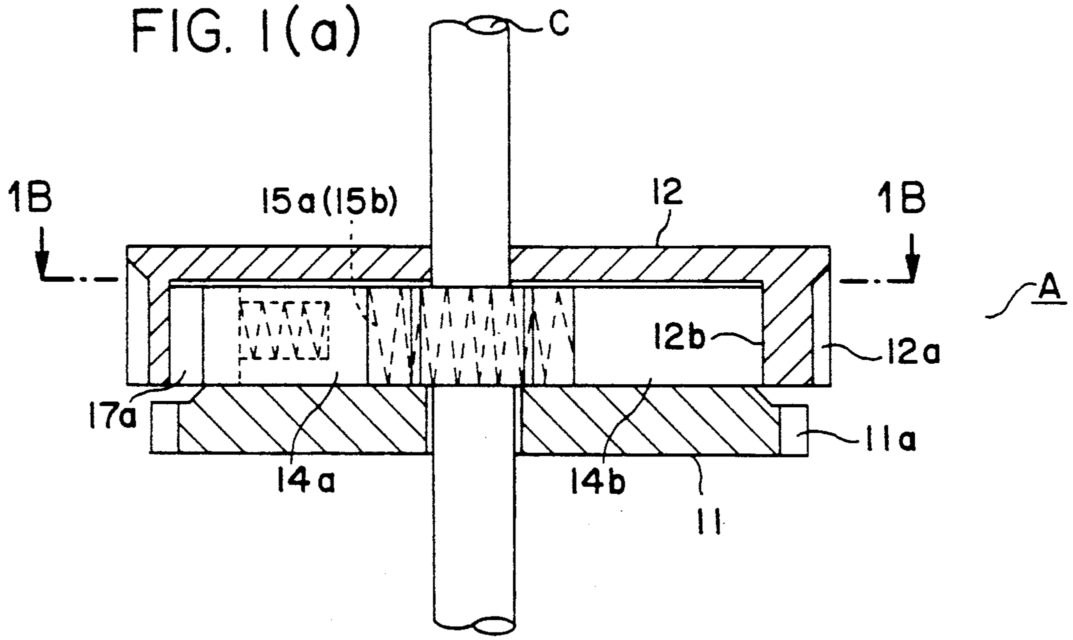
FIGS. 1(*a*) and 1(*b*) illustrate one embodiment of the present invention wherein FIG. 1(*a*) is a cross section of a clutch for use in electrically driven telescopic antennas.
Figure 1B:
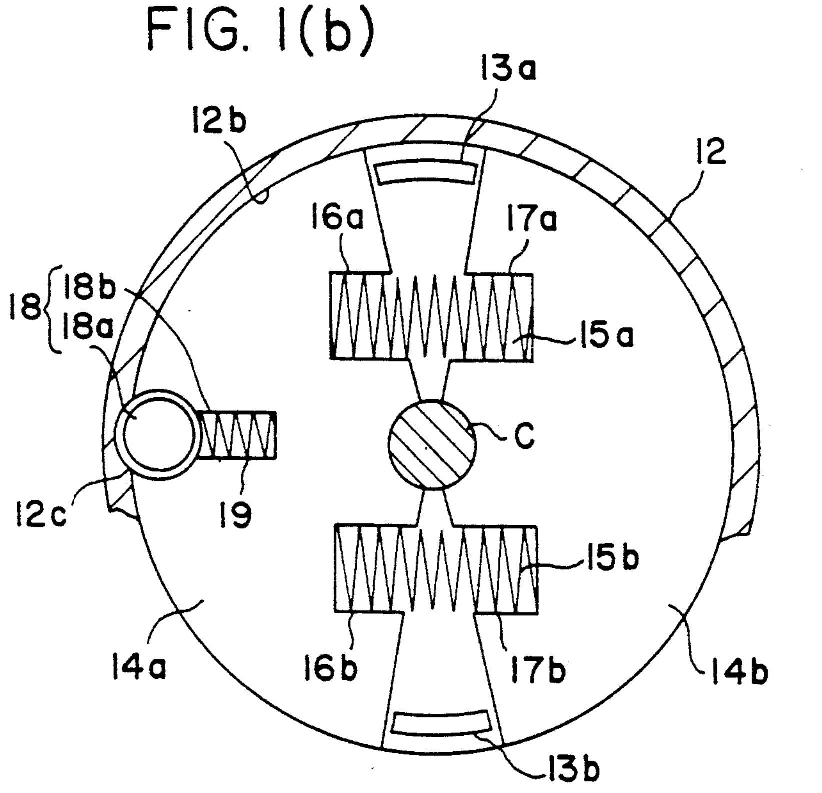

FIGS. 1(*a*) and 1(*b*) illustrate one embodiment of the present invention. FIG. 1(*a*) is a cross section of a clutch for use in electrically driven telescopic antennas, and FIG. 1(*b*) is a cross-sectional view taken along the arrows B—B in FIG. 1(*a*).

Reference numeral 11 is a first rotary element which is in the form of circular plate. In the present embodiment, this first rotary element is a main driving clutch plate. More specifically, a gear 11*a*, which receives the rotary force of a motor (not shown), is formed on the outermost circumferential portion of the first rotary element 11 which is mounted on a rotary shaft C so that the first rotary element is free to rotate around the shaft C. Reference numeral 12 is a second rotary element which is in a cylinder shape having a closed end. In this embodiment, this second rotary element 12 is the driven clutch plate. More specifically, a drive gear 12*a*, which is for driving antenna driving rope, is formed on the outer surface of the circumferential wall of the second rotary element 12, and an engaging groove 12*c* is formed in the inner surface 12*b* of the circumferential wall as an engaging recess which is in a form of indentation in the circumferential direction. The open end of the second rotary element 12 faces one side of the first rotary element 11 and is mounted on the rotary shaft C so that the second rotary element does not rotate relative to the shaft C.

Two projections 13*a* and 13*b* are formed, in symmetrical positions with respect to the rotary shaft C, on one side of the first rotary element 11, i.e. on one side of the first rotary element 11 which faces the open end of the second rotary element 12. Two sector-shape sliding contacts 14*a* and 14*b* are installed so that they sandwich the projections 13*a* and 13*b* between their respective rear ends. Each of these sector-shape sliding contacts 14*a* and 14*b* spreads outward with an angle of approximately 150 degrees centered on the rotary shaft C. The inner circumferential surfaces of the sliding contacts 14*a* and 14*b* are in sliding contact with the outer circumference of the rotary shaft C, and the outer circumferential surfaces of the sliding contacts 14*a* and 14*b* are shaped in arc-shaped surfaces capable of sliding contact with the inner surface 12*b* of the circumferential wall of the second rotary element 12. Thus, the sector-shape sliding contacts 14*a* and 14*b* are provided on the first rotary element 11 so that they can rotate with the first rotating element 11. Elastic bodies 15*a* and 15*b* such as coil springs, etc. are mounted in an elastically compressed state between the facing rear ends of the sector-shape sliding contacts 14*a* and 14*b* so that each arc-shaped surfaces of the sliding contacts 14*a* and 14*b* are pressed against the inner surface of the circumferential wall of the second rotary element 12. In order to keep the elastic bodies 15*a* and 15*b* in an elastically compressed state, spring-housing recesses 16*a* and 16*b* are formed in the sliding contacts 14*a*, and other spring-housing recesses 17*a* and 17*b* are similarly formed in the sliding contact 14*b*. These recess 16*a*, 16*b*, 17*a* and 17*b* are formed perpendicular to a line which connects the projection 13*a*, rotary shaft C and projection 13*b*. An engagement assembly 18, which consists of a cylindrical engaging pin 18*a* and a coil spring 18*b*, is provided in one of the sector-shape sliding contacts 14*a*. This engaging member 18 is designed so that a portion of the engaging pin 18*a* projects beyond the arc-shaped surface of the sliding contact 14*a* and is thus able to engage, via pressing contact, with an engaging groove 12*c* formed on the inner surface of the circumferential wall of the second rotary element 12. A housing hole 19 is formed in the arc-shaped surface of the sliding contact 14*a* so that the engaging pin 18*a* and coil spring 18*b* are kept stable. The coil spring 18*b* is independently mounted in an elastically compressed state in the innermost portion of the housing hole 19.

When the motor (not shown) rotates in the forward or reverse direction to extend or retract the antenna element, the rotary force of the motor is transmitted to the gear 11*a* of the first rotary element 11. As a result, the first rotary element 11 rotates in the forward or reverse direction. At this time, the pin 18*a* of the engagement assembly 18 is engaged with the engaging groove 12*c* of the second rotary element 12; accordingly, the second rotary element 12 can rotate together with the first rotary element 11. Thus, the antenna element, which is driven by a rope coupled to the drive gear 12*a*, is extended or retracted. When the extension or retraction of the antenna element is completed, the rotation of the second rotary element 12 is stopped, and the pin 18*a* is disengaged from the engaging groove 12*c*. Thus, the pin 18*a* is released from the engaging groove 12*c* and slides along the inner surface 12*b* of the circumferential wall of the second rotary element 12. At this time, since the arc-shaped surfaces of the sector-shape sliding contacts 14*a* and 14*b* are pressed against the inner surface 12*b* of the circumferential wall of the second rotary element 12, the first rotary element 11 rotates while generating a relatively large frictional force at the positions pressed against the second rotating element 12. Then, the first rotary element 11 alone idles for several rotations, with the pin 18*a* repeatedly engaging with and disengaging from the engaging groove 12*c*. Afterward, motor power supply is switched off by the action of a limit switch so that the rotation of the main driving clutch plate 11 also stops.

Figure 2A:
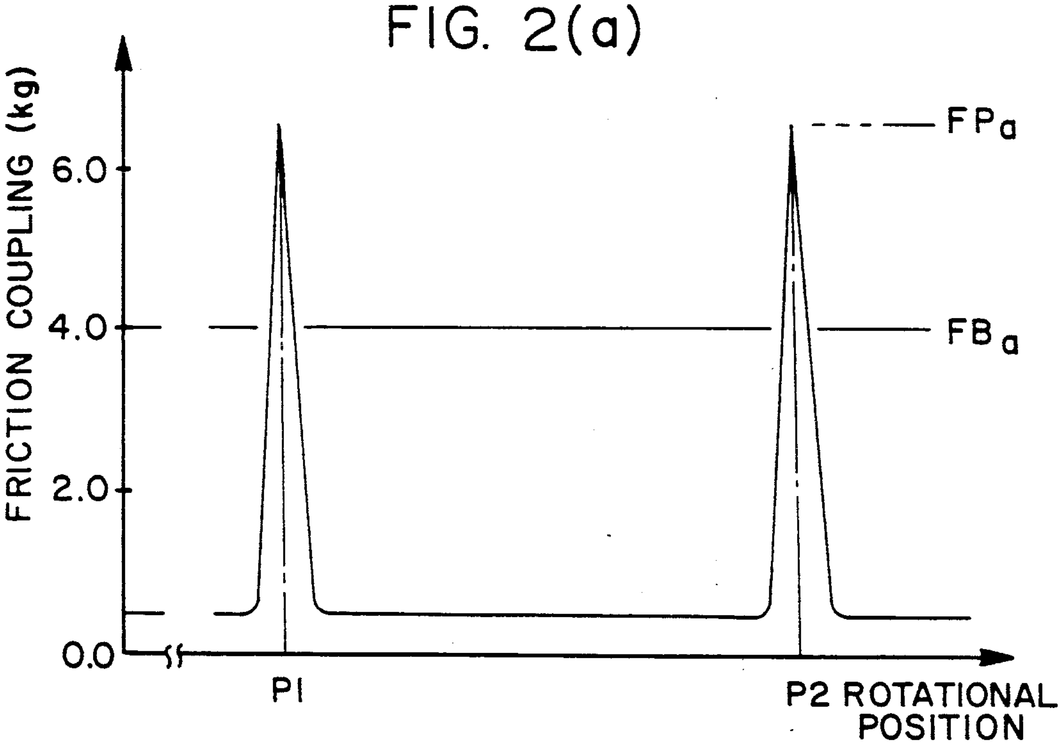
FIGS. 2(*a*) and 3(*b*) are graphs which shown a comparison of the clutch force characteristics of the embodiment and those of a conventional example.
Figure 2B:
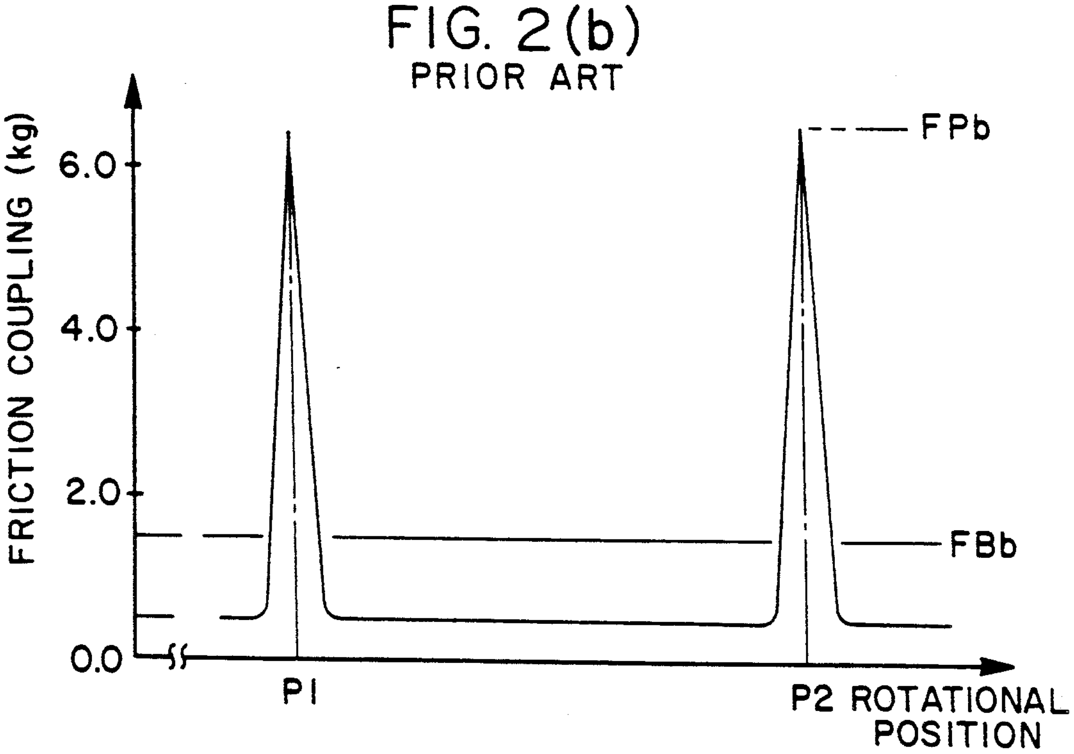
FIG. 2(b) PRIOR ART
Figure 3A:
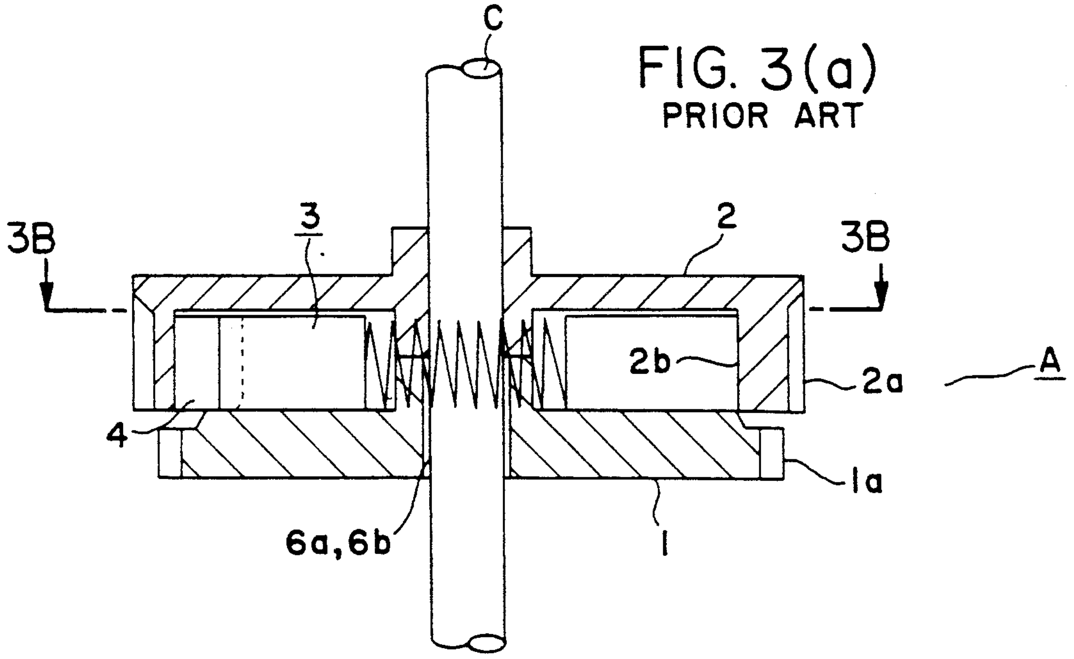
FIG. 3(a) PRIOR ART
FIGS. 3(*a*) and 3(*b*) illustrate the structure of a conventional example.
Figure 3B:
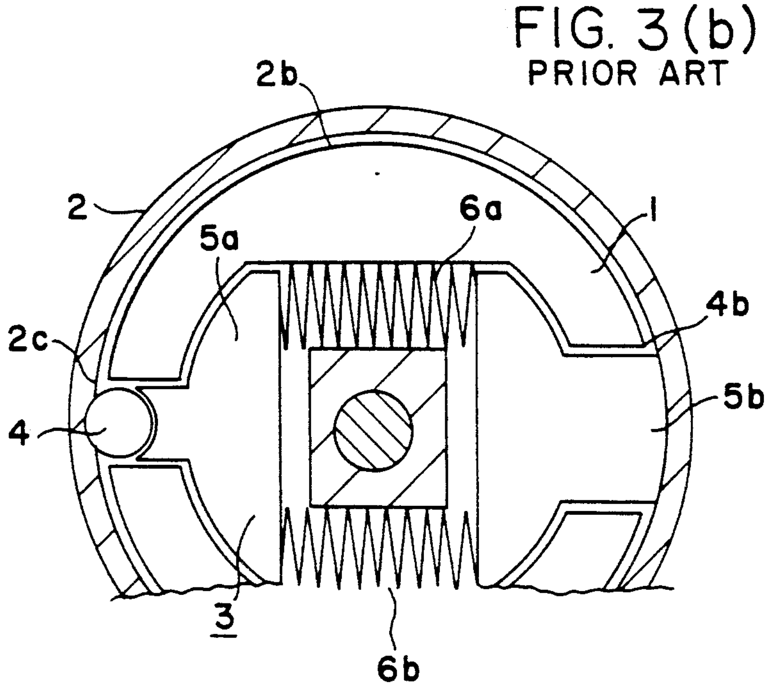
FIG. 3(b) PRIOR ART

FIG. 2(*a*) is a graph which shows the characteristics of the clutch force (frictionally transmitted force) of the present embodiment of the clutch for use in electrically driven telescopic antennas provided by the present invention. FIG. 2(*b*) is a graph of the characteristics of a conventional example shown for comparison.

First, FIG. 2(*a*) will be described. It is assumed here that the main driving clutch plate 11 is caused to idle with the driven clutch plate 12, which are shown in FIGS. 1(*a*) and 1(*b*), locked. In this case, each time the main driving clutch plate 11 completes one rotation, the pin 18*a* engages with the engaging groove 12*c* and then disengages from the engaging groove 12*c*. P1, P2, ... in FIGS. 2(*a*) and 2(*b*) indicate the points the pin 18*a* engages with the engaging groove 12*c*. The peak clutch force FPa at the engagement points P1, P2,... is approximately 6.5 kg. The basic clutch force FBa in regions other than the engagement points P1, P2,... is attributed mainly to the frictional force between the arc-shaped surfaces of the sector-shape sliding contacts 14*a* and 14*b* and the inner surface of the circumferential wall of the second rotary element 12 and is approximately 4.0 kg. The basic clutch force FBa is sufficiently greater than the force required to maintain the antenna element in a stable extended state (i. e., approximately 2.5 kg); accordingly, as described above, there is no danger that the antenna element will drop by its own weight.

Meanwhile, in FIG. 2(*b*), the peak clutch force FPb is also approximately 6.5 kg and is therefore roughly the same as FPa in FIG. 2(*a*). However, the basic clutch force FBp depends only on the frictional force between the tip of the pushing block 5*b* and the interior surface of the circumferential wall of the driven clutch plate, and such force FPs is therefore approximately 1.5 to 2.0 kg. Thus, the antenna element cannot be maintained in a stable extended state and may drop by its own weight.

As the basic clutch force FBa shown in FIG. 2(*a*) increases, the load on the main driving clutch plate during the idling gradually increases. Thus, an excessive current corresponding to the amount of the increase flows through the motor wires. Accordingly, there is, naturally, a limitation on the amount by which the clutch force can be increased. However, the time span between the point of completion of the extension or retraction of the antenna element and the point at which the motor power supply is cut off is only about 20 ms. Accordingly, even if the basic clutch force FBa increases for certain amount, this causes no practical problems. The inventors of the present application have confirmed through tests that there is no burning of motor wires even if the basic clutch force FBa is increased to approximately 4 kg.

The present invention is not limited to the embodiment described above. It goes without saying that various modifications are possible as long as there is no departure from the essence of the present invention.

In the present invention, the arc-shaped surfaces of the sector-shape sliding contacts which rotate together with a first rotary element are installed so that they press against the inner surface of the circumferential wall of a second rotary element. Accordingly, the second rotary element, which is in a form of a drum, does not generate any vibration which causes impact noise of the engagement assembly and engaging recess. Thus, the clutch force (frictionally transmitted force) between the first and second rotary elements can be increased. Accordingly, a clutch for use in electrically driven telescopic antennas, in which the impact noise caused by repeated engagement and disengagement of the engagement assembly with engaging recess of the clutch can be remarkably decreased and in which there is virtually no danger that the antenna element might drop by its own weight, can be obtained.

I claim:

1. A clutch device for electrically driven telescopic antennas characterized in that said clutch device comprises: a first rotary element which is in a circular plate form; a second rotary element which is in a cylindrical shape with a closed end has a circumferential wall and is positioned concentrically with said first rotary element so that an open end of said second rotary element faces one side of said first rotary element, said second rotary element having an engaging recess formed in an inner surface of the circumferential wall; a plurality of sector-shape sliding contacts mounted on one side of said first rotary element which faces the open end of said second rotary element so that said sector-shape sliding contacts can rotate together with said first rotary element, circumferential surfaces of said sliding contacts being in ann arc shape so as to slide in contact with said inner surface of the circumferential wall of said second rotary element; elastic bodies mounted inn an elastically compressed state between said sliding contacts so that respective arc-shaped surfaces of said sliding contacts are pressed against said inner surface of the circumferential wall of said second rotary element; and an engagement assembly provided in at least one of said sector-shape sliding contacts which are pressed against said inner surface of the circumferential wall of said second rotary element by said elastic bodies, a portion of said engagement assembly projecting beyond said arc-shaped surface of said sector-shape sliding contact so as to be capable of engaging via pressing contact with the engaging recess of said second rotary element, wherein one of said first rotary element and second rotary element is used as a main driving clutch plate connected to a motor, while the other of said rotary elements is used as a driven clutch plate connected to an antenna.

* * * * *